United States Patent
Connelly et al.

(10) Patent No.: US 8,365,352 B1
(45) Date of Patent: Feb. 5, 2013

(54) RIB AND WHEEL ASSEMBLY

(76) Inventors: G. Ivan Connelly, San Clemente, CA (US); William Brant Connelly, Woodland Hills, CA (US)

(*) Notice: Subject to any disclaimer, the term of this patent is extended or adjusted under 35 U.S.C. 154(b) by 0 days.

(21) Appl. No.: 12/884,086

(22) Filed: Sep. 16, 2010

(51) Int. Cl.
*B60B 33/06* (2006.01)

(52) U.S. Cl. .......................... 16/34; 280/47.26

(58) Field of Classification Search ............. 280/47.131, 280/47.15, 47.17, 47.18, 47.19, 47.21, 47.35, 280/47.36, 47.3, 638, 639, 649, 79.5; 16/32, 16/34

See application file for complete search history.

(56) References Cited

U.S. PATENT DOCUMENTS

| | | | |
|---|---|---|---|
| 4,265,461 A | 5/1981 | Okubo | |
| 4,846,493 A | 7/1989 | Mason | |
| 5,188,381 A | 2/1993 | Kho | |
| 5,228,706 A | 7/1993 | Boville | |
| 5,249,438 A | 10/1993 | Rhaney et al. | |
| 5,259,215 A | 11/1993 | Rocca | |
| 5,286,047 A | 2/1994 | Kho | |
| 5,373,708 A | 12/1994 | Dumonulin, Jr. | |
| 5,439,237 A | 8/1995 | Kutchie | |
| 5,465,985 A | 11/1995 | Devan et al. | |
| 5,489,107 A | 2/1996 | Kho | |
| 5,743,542 A | 4/1998 | Mast et al. | |
| 5,810,543 A * | 9/1998 | Hall | ............... 414/490 |
| 6,148,971 A | 11/2000 | Kho | |
| 6,755,428 B2 | 6/2004 | Butler | |
| 6,769,702 B2 | 8/2004 | Young | |
| 7,207,576 B1 * | 4/2007 | Ibarra | ......... 280/47.21 |
| 7,416,195 B2 * | 8/2008 | Zwack | ......... 280/47.24 |
| 7,461,477 B2 | 12/2008 | Allen | |
| 2002/0167138 A1 | 11/2002 | Butler | |
| 2008/0001373 A1 * | 1/2008 | Vaughn | ......... 280/47.26 |

* cited by examiner

*Primary Examiner* — J. Allen Shriver, II
*Assistant Examiner* — James Triggs
(74) *Attorney, Agent, or Firm* — QuickPatents; Kevin Prince

(57) ABSTRACT

A wheel assembly is disclosed for attaching to or integrally forming with an object, such as a plastic-molded tub or cooler. The wheel assembly includes an elongated axle terminating at each end with a wheel. A plurality of rails are each adapted for fixing with the bottom surface of the object. Each rail has a plurality of axle notches adapted to selectively receive the axle. A pair of arms are each fixed at a first end thereof with the axle proximate the wheels, each arm being fixed at a second end thereof to a pivot rod that is selectively and pivotally engageable with one of the axle notches. At least one axle lock is adapted to be fixed with a side surface of the object. As such, the axle may be pivoted between the inside position, wherein the object may be rolled along the ground surface on the wheels, to the outside position, whereby the axle is engaged with each axle lock and the wheels are lifted above the ground surface to prevent the object from rolling.

8 Claims, 6 Drawing Sheets

RIB AND WHEEL ASSEMBLY

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to wheels, and more particularly to a wheels assembly with multiple modes.

DISCUSSION OF RELATED ART

Items such as plastic coolers, tubs, containers, and the like are frequently moved from place to place between locations where they are used and where they are stored. A plastic cooler may be moved from a garage to a vehicle, for example, and then from the vehicle to a destination, such as a park or campsite. In cases where the item or object is fully loaded and heavy, it can be difficult to carry such an item, and thus hand trucks, roll carts, or similar tools may be used to aid in the moving of such objects.

In some cases such objects have built-in wheels on at least one side, which aid in rolling the object along a ground surface, for example. But sometimes, particularly when the ground surface is not level, built-in wheels are a liability and can enable the heavy object to roll undesirably.

U.S. Pat. No. 5,489,107 to Kho on Feb. 6, 1996 teaches a suitcase wheel assembly that provides a removable wheel structure. Such a device requires the wheels to be removed from the suitcase in order to prevent the suitcase from being able to roll, and as a result the user is left holding the wheel assembly with no convenient place to store it while it is not being used. U.S. Pat. No. 5,259,215 to Rocca on Nov. 9, 1993, and U.S. Pat. No. 5,188,381 to Kho on Feb. 23, 1993, suffer from the same drawbacks. Further, such devices include axle-retaining brackets that must be fixed to the object after the object is manufactured, and cannot be easily integrated into a mold for the object to be made integrally therewith.

U.S. Pat. No. 4,846,493 to Mason on Jul. 11, 1989 teaches a portable cooler having a retractable wheel assembly. While the wheel assembly of such a device is able to be moved between a deployed and a retracted position, the internal storage space of the cooler of such a device is impinged by the wheel assembly, and major modifications are required in the plastic mold of such a device to accommodate the wheel assembly. Further, such a device has a relatively large number of components, making the device relatively expensive to manufacture. Moreover, the wheel assembly of such a device is not readily removable for use on another device if desired. U.S. Pat. No. 5,373,708 to Dumoulin, Jr. on Dec. 20, 1994 has many of the same drawbacks.

U.S. Pat. No. 4,265,461 to Okubo on May 5, 1981, teaches a wheeled play toy that provides for a deployed and stowed configuration of a wheel assembly. Such a device, however, does not provide for ready removal of the wheel assembly for use on other objects, and does not provide a snap-fit lock of the wheel assembly in its stowed configuration. As such, the wheel assembly of such a device may vibrate or rattle while the device is being used.

Therefore, there is a need for a device that allows a wheel assembly to be deployed and securely stowed on an object to which it is attached. Such a needed device could be relatively easily incorporated into the mold of the object, and would allow the wheel assembly to be removed and applied to a different object, if desired. Further, such a needed invention would be relatively durable and inexpensive to manufacture and assemble, and relatively easy to use. The present invention accomplishes these objectives.

SUMMARY OF THE INVENTION

The present device is a wheel assembly for an object that has a bottom surface. Such an object may be a plastic-molded tub, a plastic cooler, or any other suitable object for rolling on a ground surface. The wheel assembly includes an elongated axle terminating at each end with a wheel that is rotatably fastened therewith.

The wheel assembly further includes a plurality of rails that are each adapted for fixing with the bottom surface of the object. Each rail has a plurality of axle notches that are each adapted to selectively receive the axle. Preferably each rail is short enough that an existing plastic mold for the object may be modified to include the rails, such that the object and the rails may be integrally formed by injection molding, or the like.

A pair of arms are each fixed at a first end thereof with the axle proximate the wheels, each arm being fixed at a second end thereof to a pivot rod. Each pivot rod is selectively and pivotally engageable with one of the axle notches of one of the rails. At least one foot may be further included, each foot adapted to be selectively engaged with any of the rails. Each foot is substantially as high as the radius of each wheel, such that when the object is resting on the wheels and the at least one foot, the object remains level with the ground surface.

Preferably, each wheel assembly further includes at least one axle lock adapted to be fixed with a side surface of the object. As such, the axle may be pivoted between the inside position, wherein the object may be rolled along the ground surface on the wheels, to the outside position, whereby the axle is engaged with each axle lock and the wheels are lifted above the ground surface to prevent the object from rolling. Preferably each axle lock is small enough that an existing plastic mold for the object may be readily modified to include each axle lock so that the object and each axle lock may be integrally formed.

The present invention is a device that allows a wheel assembly to be selectively switched between deployed and securely stowed positions while on an object to which it is attached. The present invention may be easily incorporated into the plastic injection mold of the object, and provides for the wheel assembly to be removed and applied to a different object, if desired by the user. Further, the present device is relatively durable and inexpensive to manufacture and assemble, and is relatively easy to use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
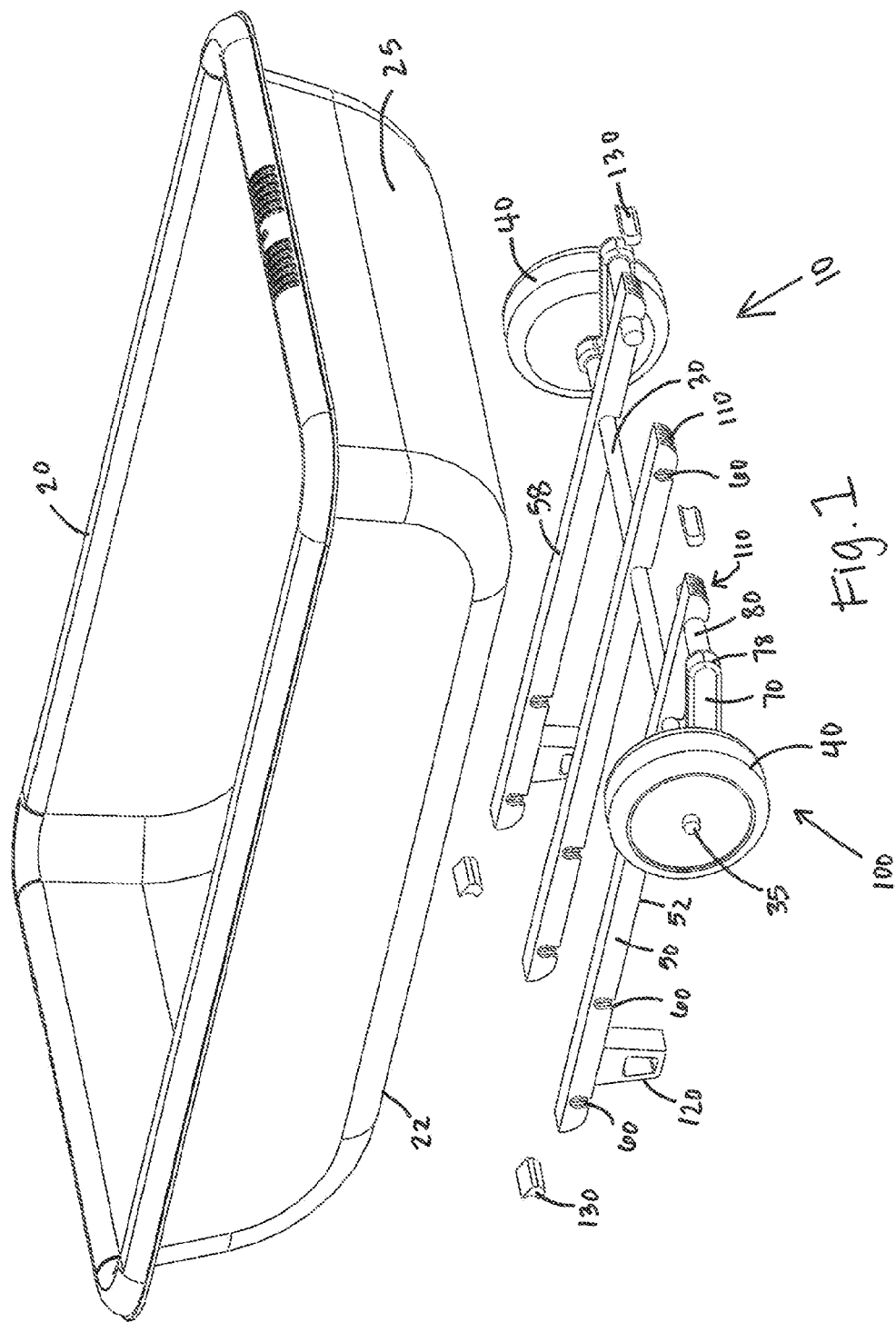
FIG. 1 is a perspective exploded view of the invention, illustrated as used with a plastic tub.
Figure 2:
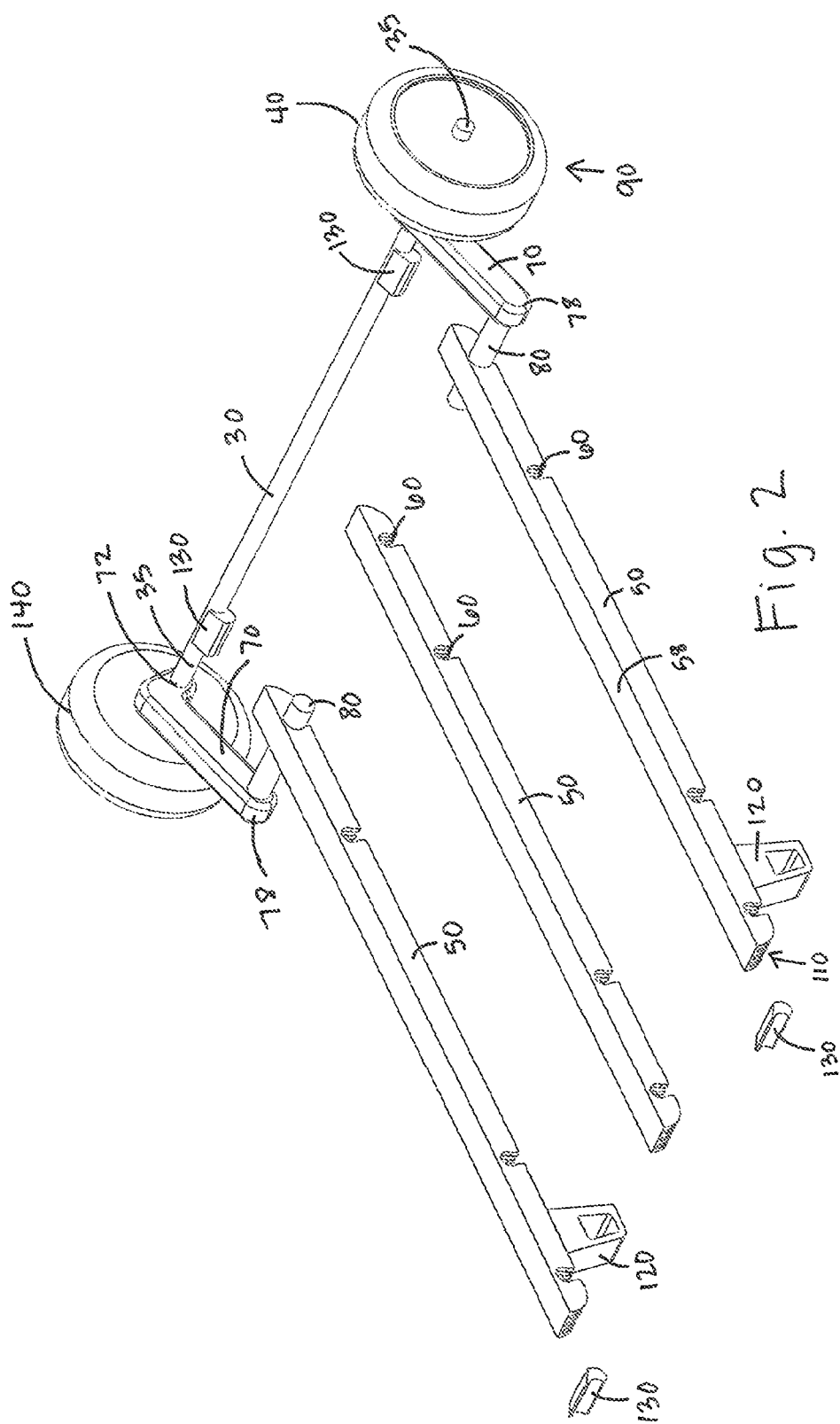
FIG. 2 is a perspective view of a wheel assembly of the invention, an axle of the invention illustrated in an outside position.
Figure 4:
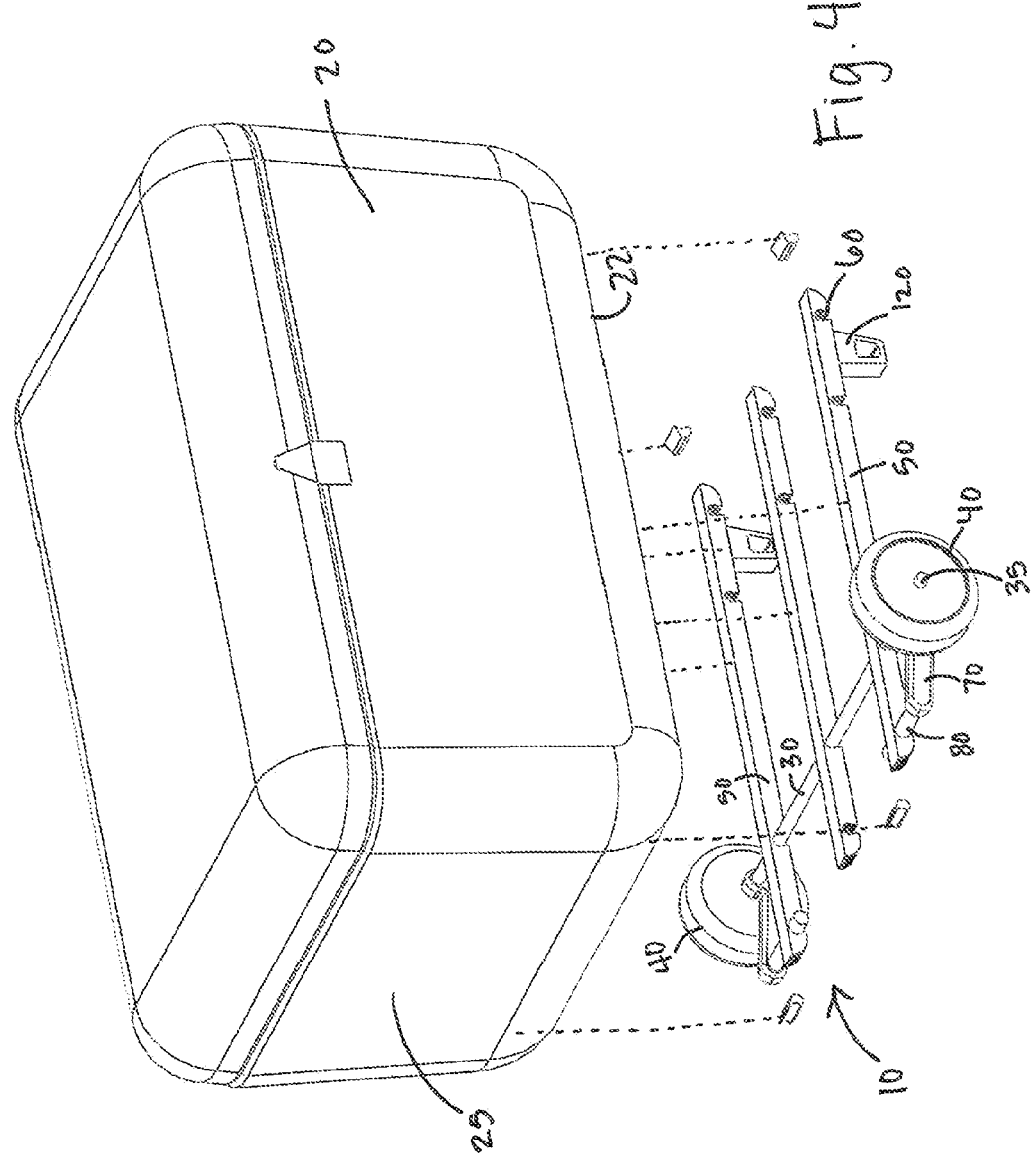
FIG. 4 is a perspective view of the invention, illustrated as used with a plastic cooler.

FIGS. 1 and 2 illustrate a wheel assembly 10 for an object 20 that has a bottom surface 22. Such an object 20 may be a plastic-molded tub, as illustrated in FIG. 1, or a plastic cooler as illustrated in FIG. 4, for example. The wheel assembly 10 for facilitating the rolling of the object 20 on a ground surface 15 may be attached to or incorporated with any suitable object 20 having a bottom surface 22 and a side surface 25.

The wheel assembly 10 includes an elongated axle 30 terminating at each end 35 with a wheel 40 that is rotatably fastened therewith. Each axle 30 is preferably made from a metal rod material, preferably extruded and cut to a suitable length.

Figure 6:
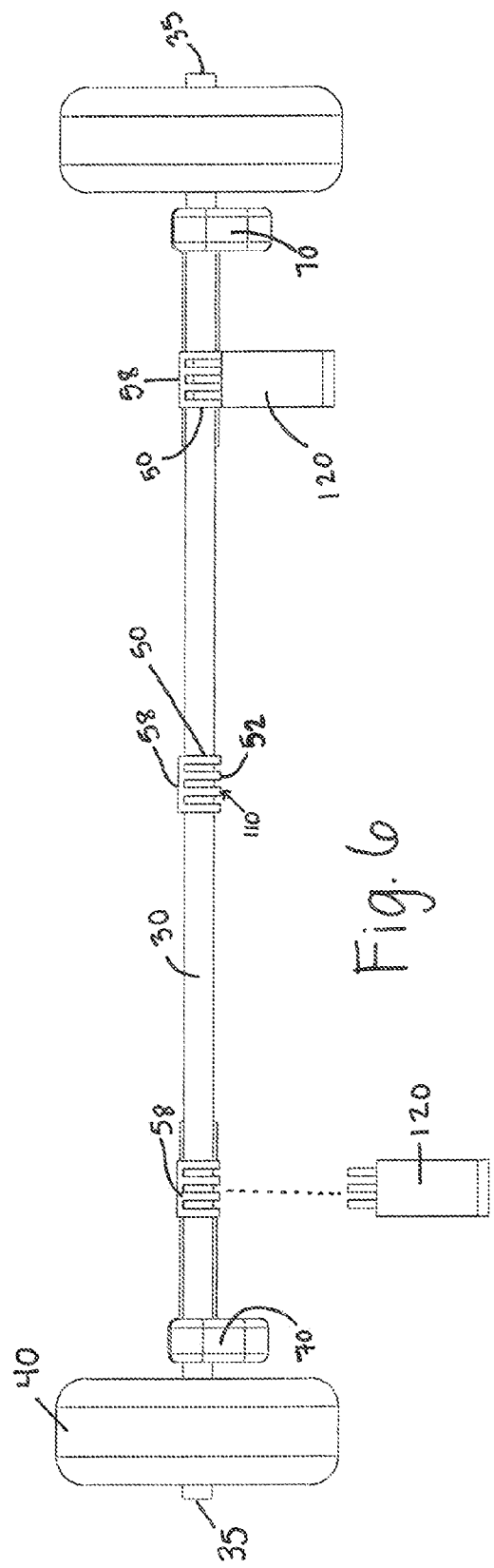
FIG. 6 is a partially exploded front elevational view of the invention, illustrating a foot of the invention for engaging with grooves of a rail of the invention.

The wheel assembly further includes a plurality of rails 50 that each have a top surface 58 and that are each adapted for fixing with the bottom surface 22 of the object 20. Each rail 50 has a plurality of axle notches 60 that are each adapted to selectively receive the axle 30. Each rail 50 may preferably include a plurality of tapered, longitudinally-aligned mold-release grooves 110 in a bottom surface 52 thereof (FIG. 6).

Preferably each rail 50 is less than 0.75 inches high (FIG. 5), whereby an existing plastic mold (not shown) for the object 20 may be modified to include the rails 50, such that the object 20 and the rails 50 are integrally formed by injection molding, or the like. Many plastic molds have at least 0.75 inches clearance in which the grooves 110 of the rails 50 may be subsequently formed. In such an embodiment, the top surface 52 of the rails 50 are integrally included in the material of the bottom surface 22 of the object 20. For clarity of illustration, the top surface 52 of the rails 50 is shown in the figures, it being understood that such a top surface 52 may not be visible when the object 20 and the rails 50 are integrally formed from injection molding or other suitable molding or manufacturing processes.

In the case where the object 20 has been previously manufactured, each rail 50 may be adhesively or ultrasonically bonded with the bottom surface 22 of the object 20. Or such rails 50 may be mechanically fastened to the bottom surface 22 of the object 20 with screws or other suitable mechanical fasteners.

A pair of arms 70 are each fixed at a first end 72 thereof with the axle 30 proximate the wheels 40, each arm 70 being fixed at a second end 78 thereof to a pivot rod 80. Each pivot rod 80 is selectively and pivotally engageable with one of the axle notches 60 of one of the rails 50. Each arm 70 and pivot rod 80 may be formed from injection molded plastic materials, or other suitably rigid and durable materials.

At least one foot 120 (FIGS. 5-6) may be further included, each foot 120 adapted to be selectively engaged with any of the rails 50. Each foot 120 is substantially as high (h) as the radius (r) of each wheel 40. Each foot 120 may be further adapted to be selectively engaged, such as with a friction fit, with any of the mold-release grooves 110 of the rails 50, in the embodiment wherein the rails 50 include the tapered mold-release grooves 110. Each foot 120 is preferably molded from injection molded plastic materials, or otherwise formed from suitably rigid and durable materials.

In use, with the plurality of rails 50 fixed with the bottom surface 22 of the object 20, and with the pivot rods 80 each engaged with one of the axle notches 60 of one of the rails 50, the axle 30 may be selectively pivoted about the pivot rods 80 from an outside position 90 (FIG. 2) to an inside position 100 (FIG. 1) and captured by one of the axle notches 60 of each rail 50. As illustrated in the figures, each rail 50 may include the axle notches 60 at either end thereof, such that the axle 30 may be selectively fixed to either side of the object 20. For example, the object 20 may be have a handle (not shown) on one side 25 of the object 20, making it more convenient for a user to fix the axle 30 in the notches 60 on the other side of the object 20.

Figure 3:
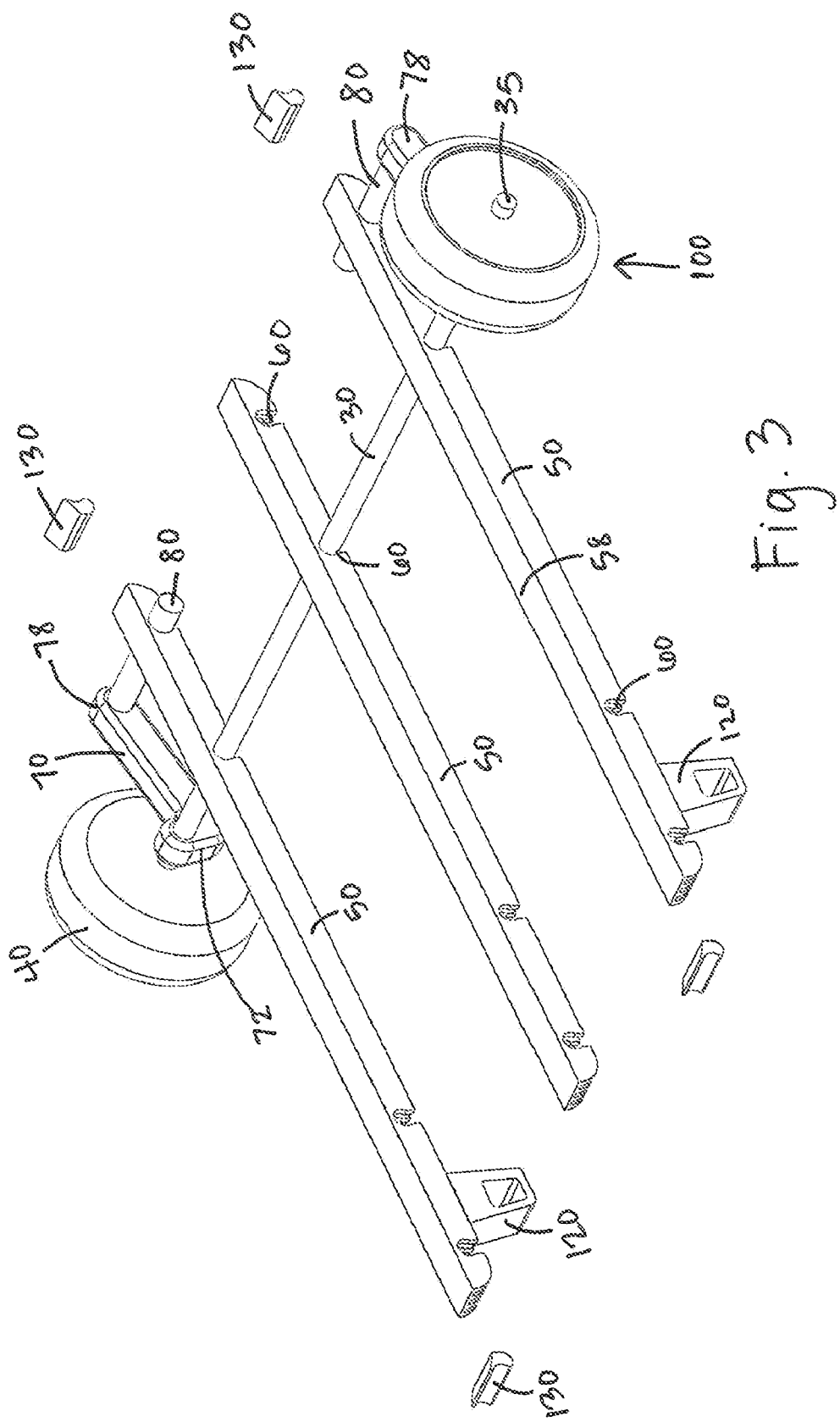
FIG. 3 a perspective view of a wheel assembly of the invention, the axle of the invention illustrated in an inside position.
Figure 5:
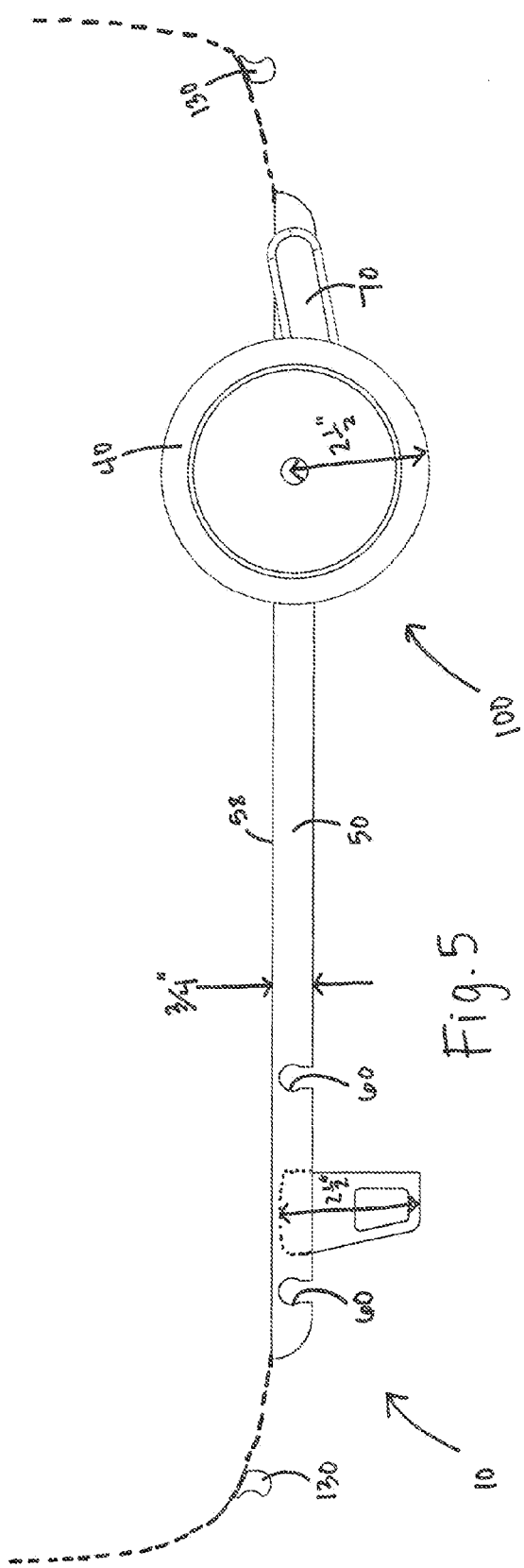
FIG. 5 is a left-side elevational view of the invention, illustrated with the axle in the inside position.

Preferably, each wheel assembly 10 further includes at least one axle lock 130 adapted to be fixed with the side surface 25 of the object 20 (FIGS. 3-5). As such, the axle 30 may be pivoted between the inside position 100, wherein the object may be rolled along the ground surface 15 on the wheels 40, to the outside position 90, whereby the axle 30 is bottom surface 52 of each rail, thereby lifting the wheels 40 above the ground surface 15 to prevent the object 20 from rolling. Preferably each axle lock 130 is less than 0.75 inches high, such that an existing plastic mold (not shown) for the object 20 may be modified to include each axle lock 130 so that the object and each axle lock 130 may be integrally formed.

While a particular form of the invention has been illustrated and described, it will be apparent that various modifications can be made without departing from the spirit and scope of the invention. For example, three rails 50 are included in the wheel assembly 10, as illustrated in the figures. However, two rails 50 may also be utilized, for example. Likewise, as illustrated in the figures, the wheel assembly includes four axle locks 130. However, two axle locks 130 may suffice. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A wheel assembly for an object having a bottom surface, comprising:
    an elongated axle terminating at each end with a wheel rotatably on the axle;
    a plurality of rails, each having a top surface and adapted for fixing with the bottom surface of the object, each rail having a plurality of axle notches each adapted to selectively receive the axle;
    a pair of arms each fixed at a first end thereof with the axle proximate the wheels, each arm fixed at a second end thereof to a pivot rod, each pivot rod selectively and pivotally engageable with one of the axle notches of the rails;
    whereby with the plurality of rails fixed with the bottom surface of the object, and with the pivot rods each engaged with one of the axle notches of the rails, the axle may be selectively pivoted about the pivot rods from an outside position to an inside position and captured by one of the axle notches of each rail.

2. The wheel assembly of claim 1 wherein each rail includes a plurality of tapered, longitudinally-aligned mold-release grooves in a bottom surface thereof.

3. The wheel assembly of claim 1 wherein each rail is less than 0.75 inch high, whereby an existing plastic mold for the object may be modified to include the rails, such that the rails and the object are integrally formed.

4. The wheel assembly of claim 1 further including at least one foot adapted to be selectively engaged with any of the rails, the foot being substantially as high as the radius of each wheel.

5. The wheel assembly of claim 2 further including at least one foot adapted to be selectively engaged with any of the mold-release grooves of the rails, the foot being substantially as high as the radius of each wheel.

6. The wheel assembly of claim 5 wherein each foot is adapted to be selectively engaged with any of the mold-release grooves of the rails by friction.

7. The wheel assembly of claim 1 further including at least one axle lock adapted to be fixed with a side surface of the object, such that the axle may be pivoted between the inside position wherein the object may be rolled on the wheels, to the outside position, whereby the axle is engaged with the axle lock and the wheels are lifted above the plane of the bottom surface of each rail.

8. The wheel assembly of claim 7 wherein each axle lock is less than 0.75 inch high, whereby an existing plastic mold for the object may be modified to include each axle lock, such that each axle lock and the object are integrally formed.

* * * * *